(12) United States Patent
Takatsuna

(10) Patent No.: US 7,847,961 B2
(45) Date of Patent: Dec. 7, 2010

(54) PRINTING SYSTEM, PRINTING APPARATUS, INFORMATION PROCESSOR, PRINTING PROGRAM, AND PRINTING METHOD

(75) Inventor: Yoshitomo Takatsuna, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1627 days.

(21) Appl. No.: 11/111,982

(22) Filed: Apr. 22, 2005

(65) Prior Publication Data
US 2005/0248799 A1 Nov. 10, 2005

(30) Foreign Application Priority Data
Apr. 22, 2004 (JP) .......................... P2004-126969

(51) Int. Cl.
G06F 3/12 (2006.01)
(52) U.S. Cl. ...................... 358/1.15; 358/1.1
(58) Field of Classification Search ............ 358/1.1, 358/1.13, 1.15, 1.18
See application file for complete search history.

(56) References Cited

U.S. PATENT DOCUMENTS
2004/0190034 A1 * 9/2004 Ozawa et al. .............. 358/1.13

FOREIGN PATENT DOCUMENTS
JP 11-119936 A 4/1999
JP 2001-117746 A 4/2001
JP 2002-370425 A 12/2002

* cited by examiner

Primary Examiner—King Y Poon
Assistant Examiner—Iriana Cruz
(74) Attorney, Agent, or Firm—Sughrue Mion, PLLC

(57) ABSTRACT

The printing system includes a printer 22 having: first input means 32 for receiving input of attribute data which indicate attributes pertaining to printing, second input means 32 for receiving input of fixation data which indicate whether or not to fix at least a portion of the print attributes corresponding to the attribute data, storage means 46 for storing the attribute data and the fixation data having been input by means of the first and second input means, and transmission means 50 for transmitting the attribute data and the fixation data stored in the storage means to the information processor upon request from the information processor; request means 91 for making a request to the transmission means of the printing apparatus for transmission of the attribute data and the fixation data; receiving means 96 for receiving the attribute data and the fixation data having been transmitted upon request from the request means; display means 98 for displaying the fixation data and the attribute data; and prohibition means for, when the fixation data indicate fixing of at least a portion of the print attributes, prohibiting changing of attribute data corresponding to the fixed print attributes.

4 Claims, 9 Drawing Sheets ical user interface) provided by a printer driver program having been installed in an information processor, and thereafter printing is performed in accordance with the print attributes.

PRINTING SYSTEM, PRINTING APPARATUS, INFORMATION PROCESSOR, PRINTING PROGRAM, AND PRINTING METHOD

BACKGROUND OF THE INVENTION

The present invention relates to a printing system, a printing apparatus, an information processor, a printing program, and a printing method.

When data, such as images generated by an information processor, are printed by means of a printing apparatus, printing is performed, for instance, as disclosed in JP-A-2001-117746 (abstract, claims), as follows. Print attributes, such as a size and type of printing paper, print position, and printing method, are set by means of a GUI (graphical user interface) provided by a printer driver program having been installed in an information processor, and thereafter printing is performed in accordance with the print attributes.

Meanwhile, in recent years, printing apparatuses in which print attributes can be set, such as printers of a stand-alone type, have become commercially available. Such a printing apparatus has a problem that, when print attributes having been set on the printing apparatus side differ from those having been set on an information processor side, normal printing is prohibited.

In addition, such a printing apparatus has another problem that, in a case where the printing apparatus is shared by a plurality of information processors, when print attributes of the printing apparatus are changed by one user, thereafter, printing performed for other users has attributes other than those intended.

SUMMARY OF THE INVENTION

The present invention has been conceived in view of the above circumstances, and aims at providing a printing system, a printing apparatus, an information processor, a printing program, and a printing method, which enable normal printing with use of a printing apparatus in which print attributes can be set.

In an illustrative, non-limiting embodiment of the present invention, when setting of print attributes is made on a printer side, the environment is fixed. Accordingly, it is possible to prevent printing in accordance with a wrong setting, such as a setting made on a computer side and different from the setting on the printer side. In addition, when the environment is not be fixed, the attributes can be arbitrarily changed.

The present disclosure relates to the subject matter contained in Japanese patent application No. 2004-126969 (filed on Apr. 22, 2004), which is expressly incorporated herein by reference in its entirety.

DESCRIPTION OF THE PREFERRED EMBODIMENT

Hereinafter, embodiments of the invention will be described by reference to the drawings.

First, an overview of a printing apparatus will be described by reference to FIGS. 1 and 2. Meanwhile, hereinafter, a combination of a printing apparatus 22 and a computer 90 is referred to as a "printing system."

Figure 1:
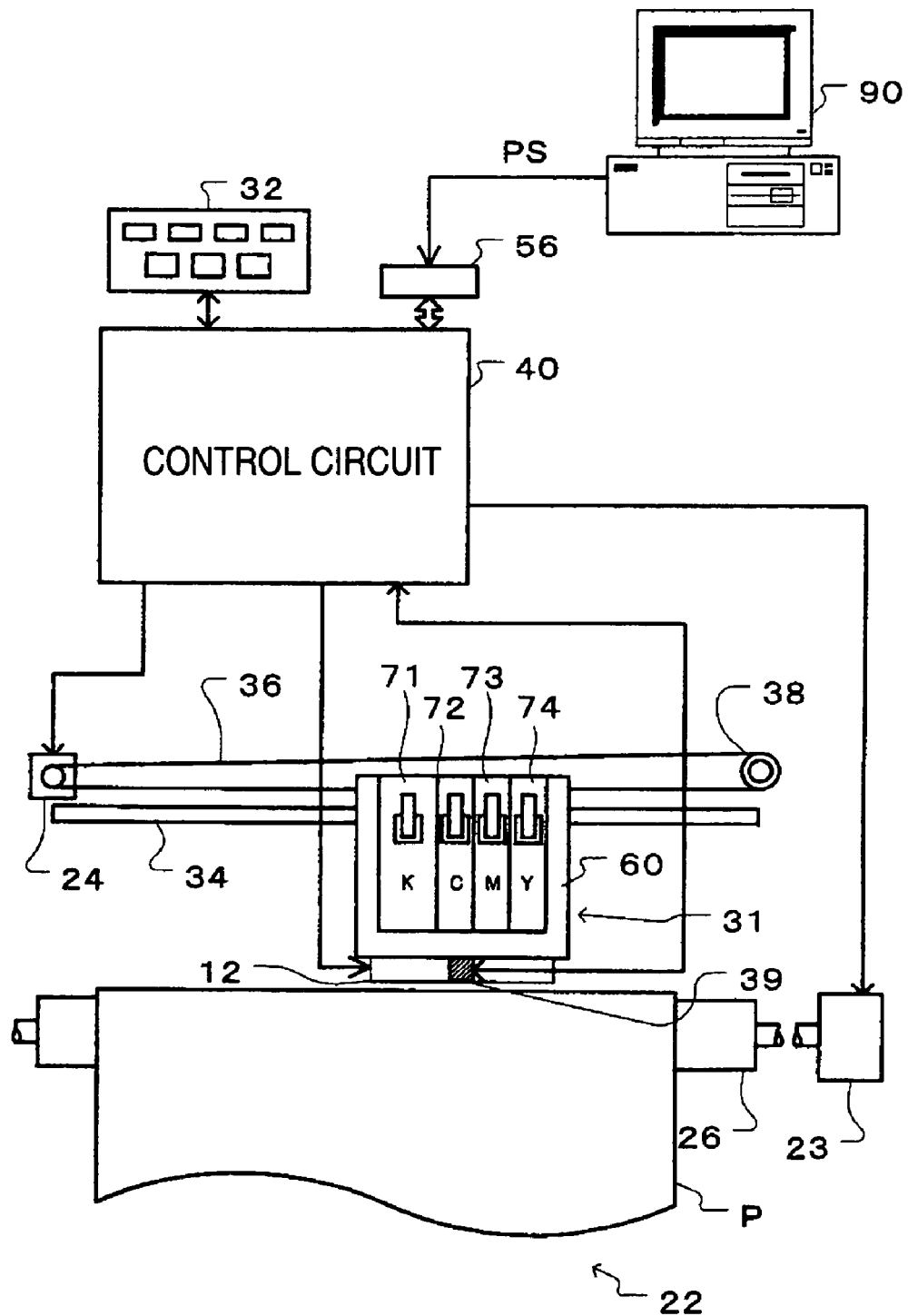
FIG. 1 shows a schematic constitutional view of a printing system according to an embodiment of the present invention.

FIG. 1 shows a schematic configuration of the printer 22 constituting the printing system. FIG. 2 is a block diagram showing an example configuration of an essential portion of the printer 22 while highlighting a control circuit 40.

As shown in FIG. 1, the printer 22, which serves as a printing apparatus, comprises a sub-scanning feed mechanism for transporting printing paper P by means of a paper feed motor 23, and a main-scanning feed mechanism for reciprocating a carriage 31 in a direction parallel to a shaft of a paper feed roller 26, by means of a carriage motor 24. Here, a feed direction along which the printing paper P is fed by the sub-scanning feed mechanism is referred to as a sub scanning direction, and a direction along which the main-scanning feed mechanism moves the carriage 31 is referred to as a main scanning direction.

In addition, the printing apparatus 22 comprises a print head unit 60 which is mounted on the carriage 31 and has a print head 12; a head drive mechanism which drives the print head unit 60, to thus control ejection of ink and dot formation; and a control circuit 40 for managing exchange of signals with the paper feed motor 23, the carriage motor 23, the print head unit 60, and a control panel 32. The control panel 32—which serves as first input means and also as second input means—generates data in accordance with an operation performed by a user, and outputs the data.

Next, the configuration of the print head 12 will be described by reference to FIG. 1.

As shown in FIG. 1, four cartridges 71 through 74, constituted of a cartridge 71 which stores black (K) ink, a cartridge 72 which stores cyan (C) ink, a cartridge 73 which stores magenta (M) ink, and a cartridge 74 which stores yellow (Y) ink, are detachably mounted on the carriage 31.

The print head 12 is disposed on a lower section of the carriage 31. On the print head 12, nozzles—through which ink is ejected—are arranged in columns along the transport direction of the printing paper P, thereby forming nozzle columns, one for each color of ink. The nozzles serve as a dot formation element.

In addition, a piezoelectric element—which is an electrostrictive device and exhibits superior response—is disposed in each of the nozzle columns disposed at the lower section of the carriage 31 and corresponds to the respective ink. The piezoelectric element is disposed at a position in contact with a member forming an ink channel which guides ink to the nozzle. Upon application of electrical voltage, a crystalline structure of the piezoelectric element is distorted, thereby converting electricity into mechanical energy at an extremely high speed.

In the embodiment, voltage is applied, for a predetermined period of time, between electrodes disposed on opposite ends of the piezoelectric element. Accordingly, the piezoelectric element is expanded only for the period of time of voltage application, thereby deforming a side wall of the ink channel. As a result, the ink channel is reduced in volume in relation to the expansion of the piezoelectric element, and ink of an amount corresponding to this reduction in volume is ejected at high speed from a tip of the nozzle, in the form of a droplet. The ink droplet impregnates the printing paper P having been aligned with the paper feed roller 26. Hence, a dot is formed, and printing is performed. The size of the ink droplet can be changed through a method for applying voltage to the piezoelectric element.

The control circuit 40 is connected to the computer 90 by way of a connector 56. As will be described later, the computer 90 includes a driver program for the printer 22; and constitutes a user interface. The user interface receives a user's command provided through operations making use of a keyboard, mouse, or the like, serving as an input device; and provides a variety of information with regard to the printer 22 to a user by means of displaying the information on a screen of a display device.

The sub-scanning feed mechanism for transporting the printing paper P includes a gear train (not shown) which transfers rotation of the paper feed motor 23 to the paper feed roller 26 and to a paper transport roller (not shown).

The main-scanning feed mechanism for reciprocating the carriage 31 comprises a sliding shaft 34 which extends parallel to the shaft of the paper feed roller 26 and which slidably holds the carriage 31, a pulley 38 which stretches an endless drive belt 36 between the pulley 38 and the carriage motor 24 in a tensioned manner, and an optical sensor 39 which detects a home position of the carriage 31 and which serves as the first input means. Meanwhile, the optical sensor 39 is constituted of a light source for projecting light on the printing paper P, and a line sensor (or a CCD device) which converts light reflected by the printing paper P into corresponding image signals.

Figure 2:
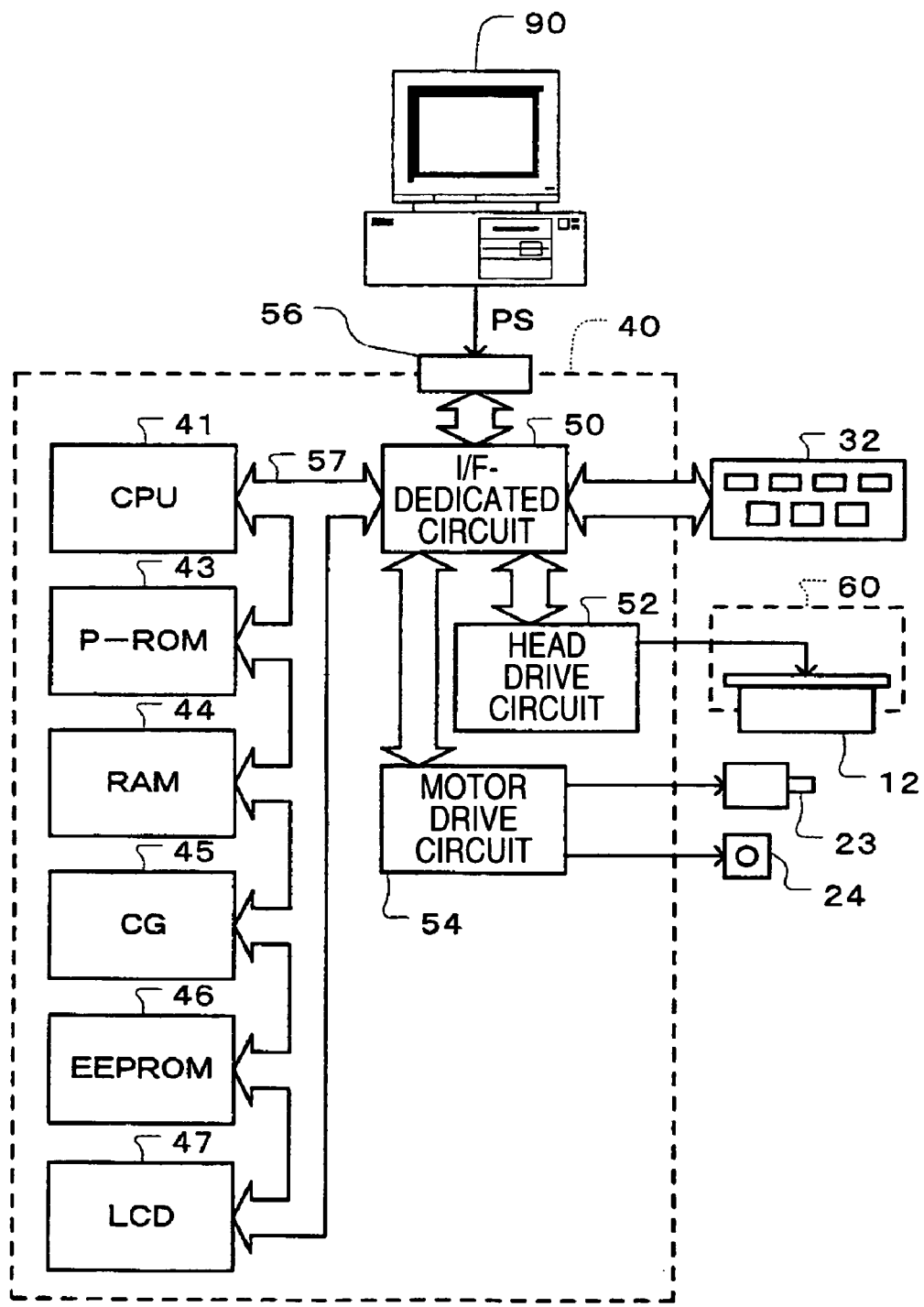
FIG. 2 is a block diagram showing a configuration of an essential portion of a printer shown in FIG. 1.

As shown in FIG. 2, the control circuit 40 is constituted as an arithmetic logic circuit including a CPU (central processing unit) 41, programmable ROM (P-ROM (read only memory) 43 serving as storage means, RAM (random access memory) 44, a CG (character generator) 45 which stores dot matrixes of characters, EEPROM (electronically erasable and programmable ROM) 46 serving as storage means, and an LCD (liquid crystal display) 47.

The control circuit 40 also serves as transmission means, and comprises an I/F-dedicated circuit 50 serving as an I/F (interface) to an external motor, and the like; a head drive circuit 52 which drives the print head unit 60 to thus cause ejection of ink; and a motor drive circuit 54 which drives the paper feed motor 23 and the carriage motor 24.

The I/F-dedicated circuit 50 incorporates a parallel interface circuit or a serial interface circuit, and is capable of receiving a print signal PS supplied from the computer 90 by way of the connector 56. More specifically, the I/F-dedicated circuit 50 is constituted of a USB (universal serial bus) I/F, an IEEE (Institute of Electrical and Electronics Engineers) 1394 I/F, a LAN (local area network) I/F, and a wireless I/F.

The EEPROM 46 or the P-ROM 43 stores attribute data, which will be described later. The LCD 47 is a display device for presenting information to the user.

Next, the configuration of the computer 90 serving as an information processor will be described by reference to FIG. 3.

Figure 3:
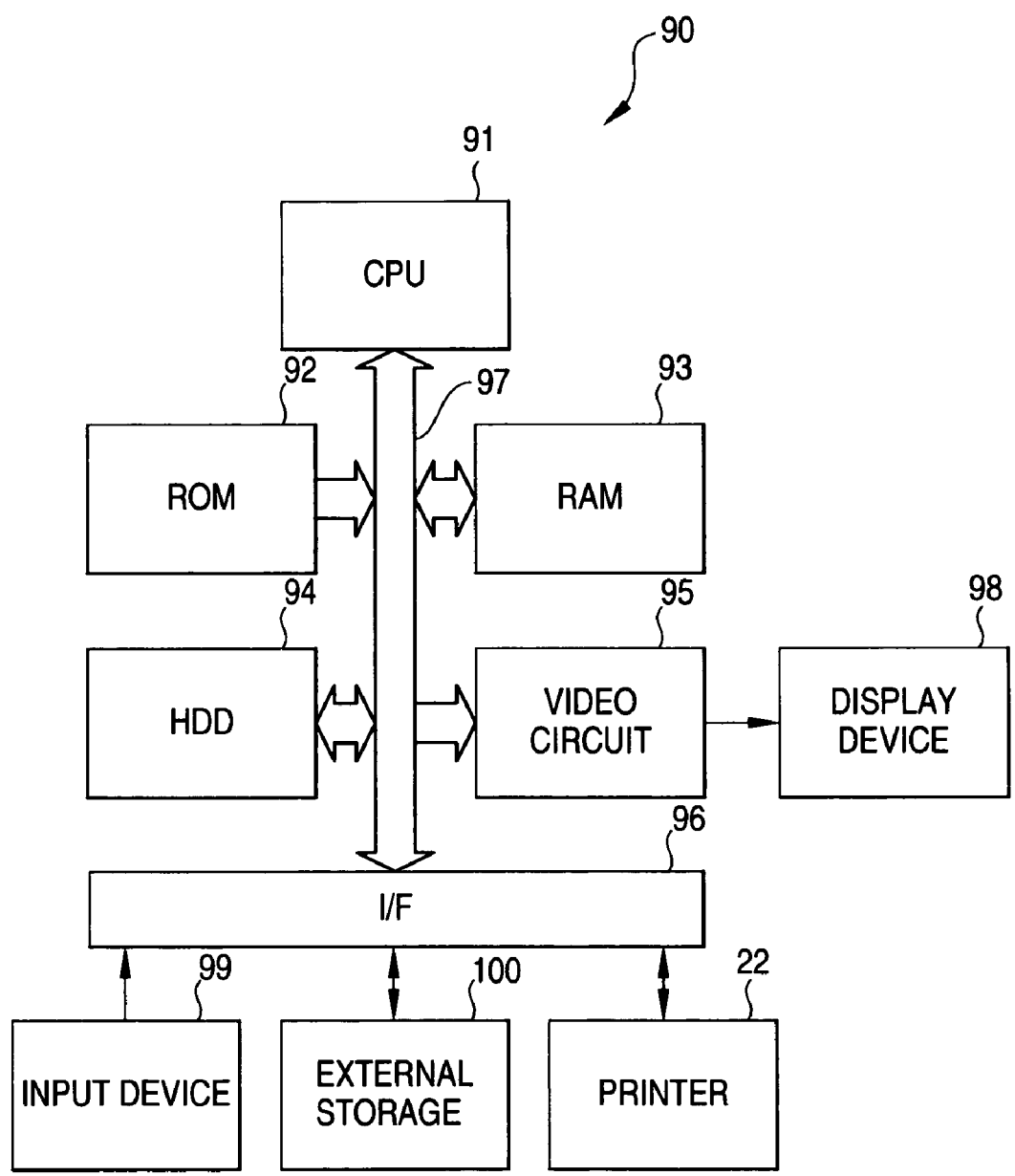
FIG. 3 is a block diagram showing a configuration of a computer shown in FIG. 1 in detail.

As shown in FIG. 3, the computer 90 comprises a CPU 91, ROM 92, RAM 93, an HDD (hard disk drive) 94, a video circuit 95, an I/F 06, a bus 97, a display device 98, an input device 99, and an external storage 100.

The CPU 91, serving as request means and as prohibition means, is a control section which performs a variety of calculation operations in accordance with programs stored in the ROM 92 and the HDD 94, and which controls respective sections of the apparatus.

The ROM 92 is a memory which stores basic programs and data performed by the CPU 91. The RAM 93 is a memory which temporarily stores a program during execution thereof by the CPU 91 and data during calculation by the same.

The HDD 94 is a recording device which, upon request from the CPU 91, reads out data and a program stored in a hard disk—serving as a recording medium—and which records data—generated as a result of calculation operations by the CPU 91—in the hard disk.

The video circuit 95, constituting a portion of display means, executes rendering processing in accordance with a rendering command supplied from the CPU 91, and converts the thus obtained image data into video signals, thereby outputting the video signals to the display device 98.

The I/F 96, serving as receiving means, appropriately converts forms of presentation of a signal output from the input device 99 and from the external storage 100, and outputs the print signal PS to the printer 22.

The bus 97 is a set of signal lines which interconnect between the CPU 91, the ROM 92, the RAM 93, the HDD 94, the video circuit 95, and the I/F 96, thereby enabling exchange of data therebetween.

The display device 98 constituting a portion of the display means is a device constituted of, for instance, an LCD (liquid crystal display) monitor or a CRT (cathode ray tube) monitor, and displays images in accordance with video signals output from the video circuit 95.

The input device 99 is a device constituted of, for instance, a keyboard or a mouse, and generates a signal in accordance with an operation by a user, thereby supplying the signal to the I/F 96.

The external storage device 100 is a device constituted of for instance, a CD-ROM (compact disk-ROM) drive unit, an MO (magneto optic) drive unit, or an FDD (flexible disk drive) unit. The external storage device 100 reads out data and a program stored in the CD-ROM disk, MO disk, or FD, thereby supplying the data and program to the CPU 91. In addition, when the external storage device 100 is an MO drive unit or an FDD unit, the external storage device 100 is a device which records data supplied from the CPU 91 in the MO disk or the FD.

Figure 4:
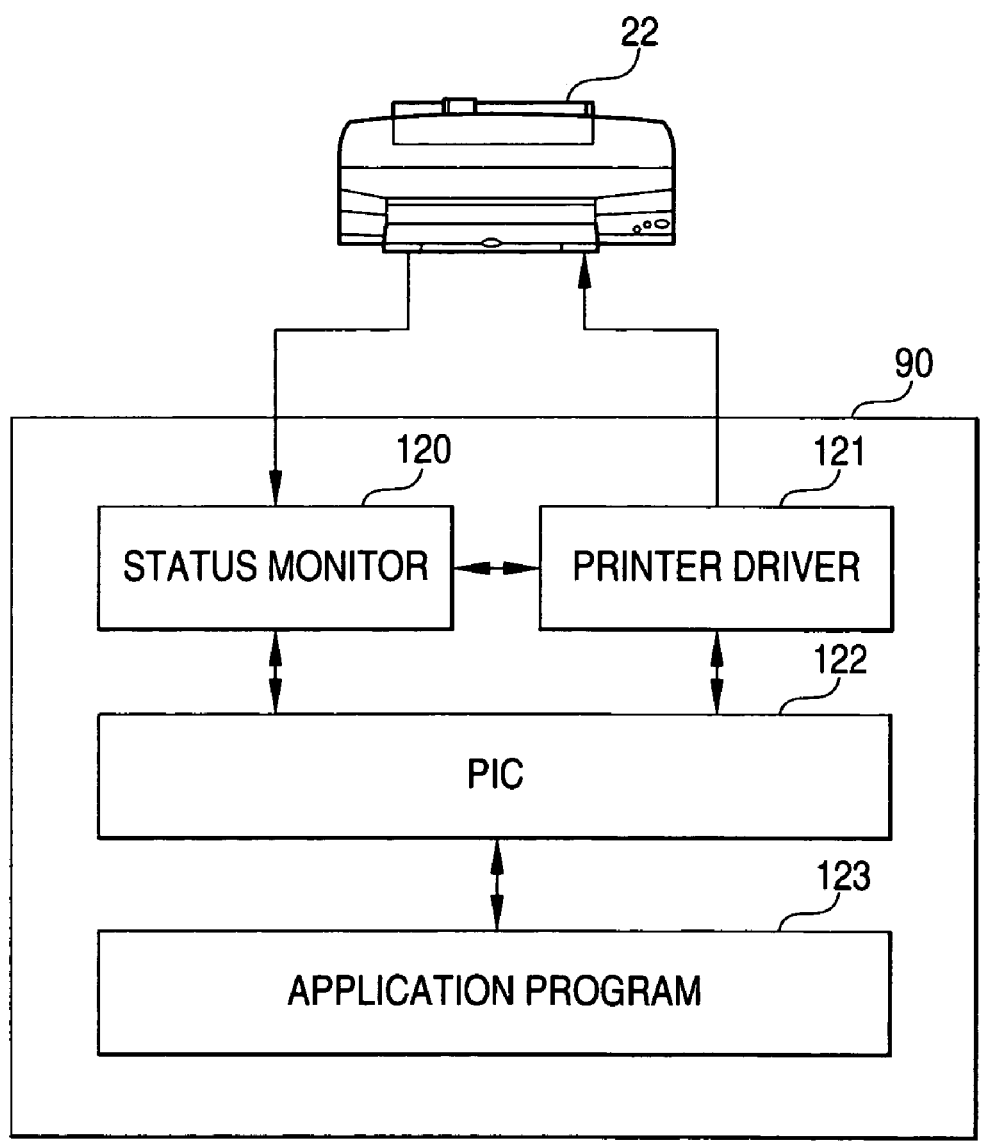
FIG. 4 is a view showing a program to be installed in the computer shown in FIG. 1.

FIG. 4 is a view for explaining functions of programs installed in the computer 90. Meanwhile, these functions are implemented through cooperation between hardware of the computer 90 and software recorded in the HDD 96. As shown in the drawing, a status monitor 120, a printer driver 121, a PIC (printer interface controller) 122, and an application program 123 are installed in the computer 90, and operate under a predetermined operating system (OS).

The status monitor 120 acquires attribute data having been set in the printer 22. The printer driver 121 applies resolution conversion, halftone processing, and the like, to image data supplied from the PIC 122, thereby generating a print signal PS; and supplies the signal to the printer 22. The PIC 122 enables exchange of data between the application program 123, the status monitor 120, and the printer driver 121. The application program 123 is, for instance, an imaging program, and generates data, such as image or texts, in accordance with an operation by a user.

Next, operations of the above-mentioned embodiment will be described.

First operations for setting attribute data will be described. The attribute data referred to here are data related to print processing performed by the printer 22, and include those indicating, for instance, a size and type of printing paper, a print position, a printing method, and the like.

Figure 5:
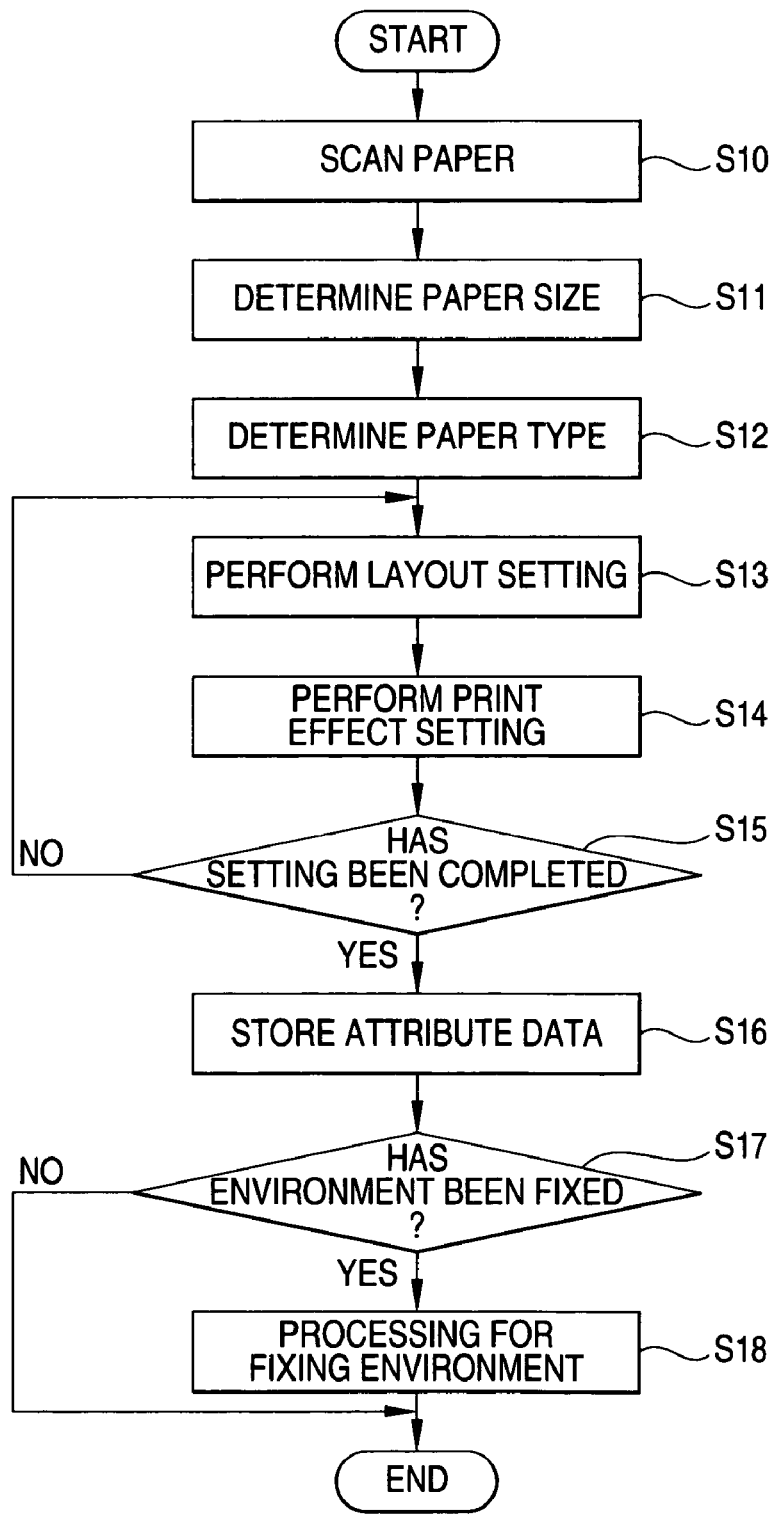
FIG. 5 is a flowchart for explaining operations of the printer shown in FIG. 1.

FIG. 5 is a flowchart for explaining operations for setting attribute data by means of operating the printer 22. When a user places printing paper P on an unillustrated stocker of the printer 22, and, thereafter, operates the control panel 21 to instruct setting of attribute data, the following processing is executed.

Step S10: The CPU 41 executes a paper scan processing so as to determine a size of the printing paper. More specifically, the CPU 41 drives the carriage motor 24, thereby moving the carriage 31 in the main scanning direction; measures a lateral length of the printing paper P by means of referring to a detection signal output from the optical sensor 39; and measures a light reflectance on the surface of the printing paper P.

Step S11: The CPU 41 determines a size of the printing paper on the basis of a scan result in step S10. More specifically, the CPU 41 determines a size (e.g., A4-size, B-5 size, or the like) of the printing paper currently placed in the stocker by means of, for instance, searching a paper size corresponding to the lateral length detected in Step S10 from a table in which lateral lengths and paper sizes are correlated.

Step S12: The CPU 41 determines a type of the paper. Specifically, the CPU 41 determines a type of paper (e.g., glossy paper, plain paper) through use of the light reflectance on the surface of the printing paper P measured in step S10. More specifically, the CPU 41 determines a type of the paper corresponding to the reflectance detected in step S10 from a table in which paper types and their reflectance are correlated and stored.

Step S13: The CPU 41 sets a layout. More specifically, the CPU 41 displays information (e.g., a menu) for setting a layout on the LCD 47, thereby prompting a user to select a desired layout. The layout to be set is selected from, for instance, lateral-midline alignment, vertical-midline alignment, left-justification, right-justification.

Step S14: The CPU 41 is subjected to setting of a print effect. More specifically, the CPU 41 displays information for setting a print effect on the LCD 47, thereby prompting the user to select a desired print effect. Examples of the print effect include edge-enhancing processing, gradation processing, and tone-adjustment processing.

Step S15: The CPU 41 determines whether or not to complete the setting. When the setting is to be completed, the flow advances to step S16; and in other cases, the flow returns to step S13, and performs processing similar to that having been performed previously.

Step S16: The CPU 41 stores the attribute data input in steps S11 through S14 in, for instance, the P-ROM 43 or the EEPROM 46.

Step S17: The CPU 41 receives an input as to whether or not to fix the attribute data having been acquired in steps S11 through S14. For instance, when the operation section 82 is operated and a command for fixing environment is input, the flow advances to step S18; and in other cases, processing ends. The environment referred herein indicate contents of the print attributes having been set, which are attributes pertaining to printing.

Step S18: The CPU 41 executes processing of fixing environment. More specifically, the CPU 41 sets environment setting data which assume either "0" or "1," to, e.g., "1," and stores the data in the P-ROM 43 or the EEPROM 46. Through processing, the data as shown in FIG. 6 are stored in the P-ROM 43 or the EEPROM 46 of the printer 22.

Figure 6:
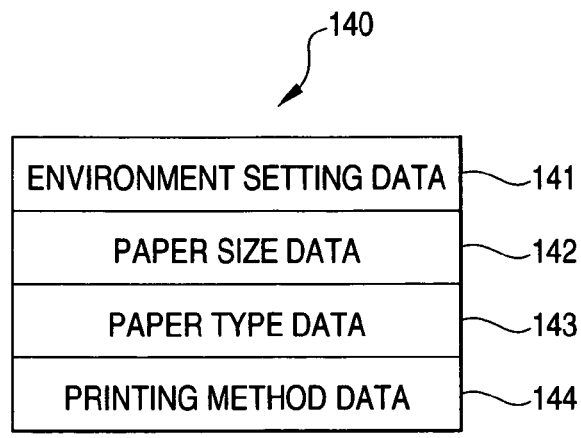
FIG. 6 is a view showing an example of attribute data pertaining to the printer shown in FIG. 1.

In the example shown in FIG. 6, environment setting data 141, paper-size data 142, paper-type data 143, and printing method data 144 are stored as attribute data 140. As described above, the environment setting data 141 referred to here are data indicating whether or not to fix the environment. When the environment is to be fixed, the environment setting data 141 are set to "1," and when the same are not to be fixed, set to "0." The paper-size data 142 are data indicating a size of the printing paper P; and, for instance, "A4" or "B5" is stored as the paper-size data. The paper-type data 143 are data indicating a type of the printing paper P; and, for instance, "glossy paper" or "plain paper" is stored as the paper-type data. The printing method data 144 are data indicating a printing method; and, for instance, "edge-enhancing processing," "gradation processing," or "tone-adjustment processing" is stored as the printing method data.

Next subsequent to the above-described setting of the print attributes by the printer 22, processing for printing image data produced by the application program 123 of the computer 90, or the like, will be described.

Figure 7:
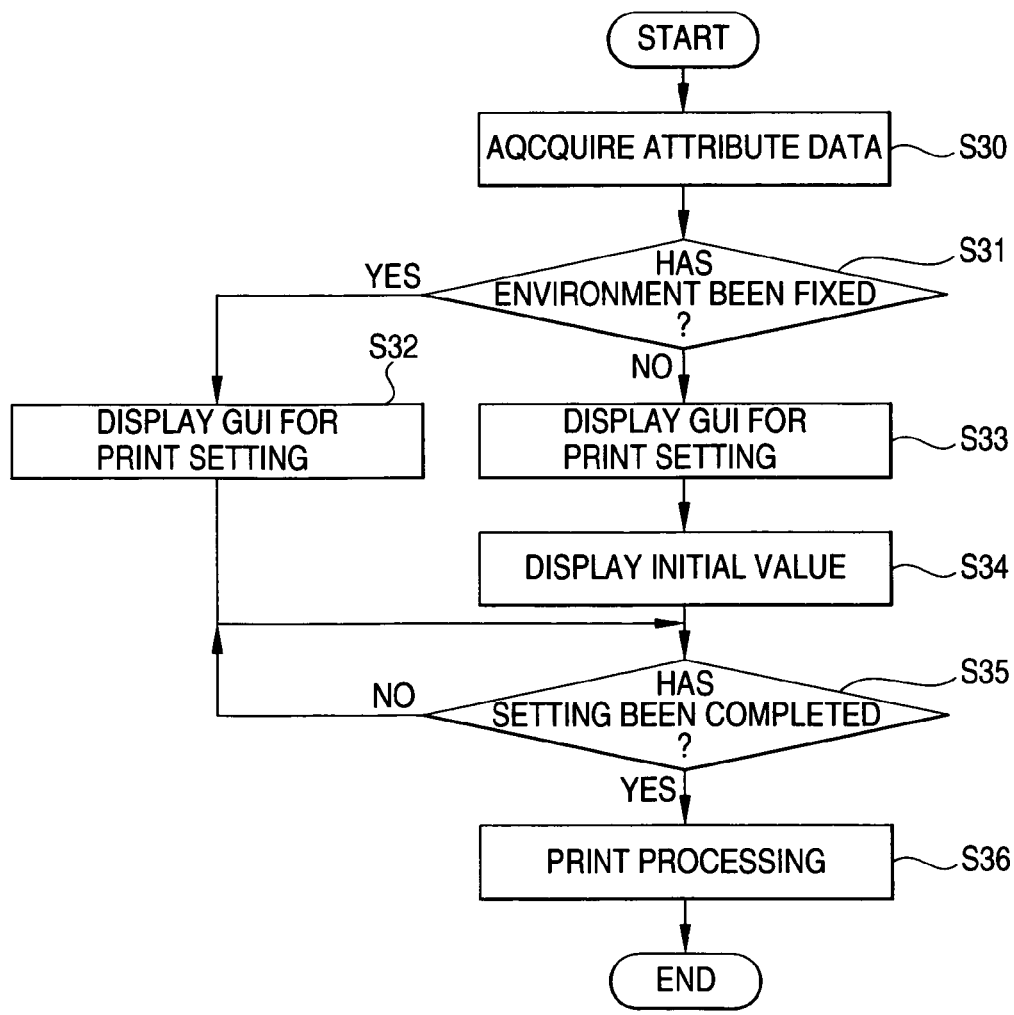
FIG. 7 is a flowchart for explaining operations of the computer shown ir FIG. 1.

FIG. 7 is a view showing an example of the processing to be executed when image data produced by the application program 123 of the computer 90 are printed. Processing comprises the following steps.

Step S30: The CPU 91 controls the status monitor 120 and requests the printer 22 to transmit the attribute data 140. As a result, the CPU 41 of the printer 22 reads out the attribute data 140 stored in the P-ROM 43 or the EEPROM 46, and transmits the same to the computer 90 by way of the I/F dedicated circuit 50. The CPU 91 of the computer 90 receives the attribute data by way of the I/F 96.

Step S31: The CPU 91 acquires the environment setting data 141 byway of the status monitor 120, and determines whether or not the setting has been made so as to fix the environment. More specifically, when the value of the environment setting data 141 is "1," the CPU 91 determines that the setting has been made so as to fix the environment, and the flow advances to step S32; in other cases, the flow advances to step S33.

Step S32: The CPU 91 causes the display device 98 to display a GUI for print setting. More specifically, the CPU 91 acquires predetermined data stored in the HDD 94, and supplies the data to the video circuit 95. As a result, the video circuit 95 executes rendering processing, and the thus obtained video signals are supplied to the display device 98. Subsequently, the flow proceeds to step S35.

Figure 8:
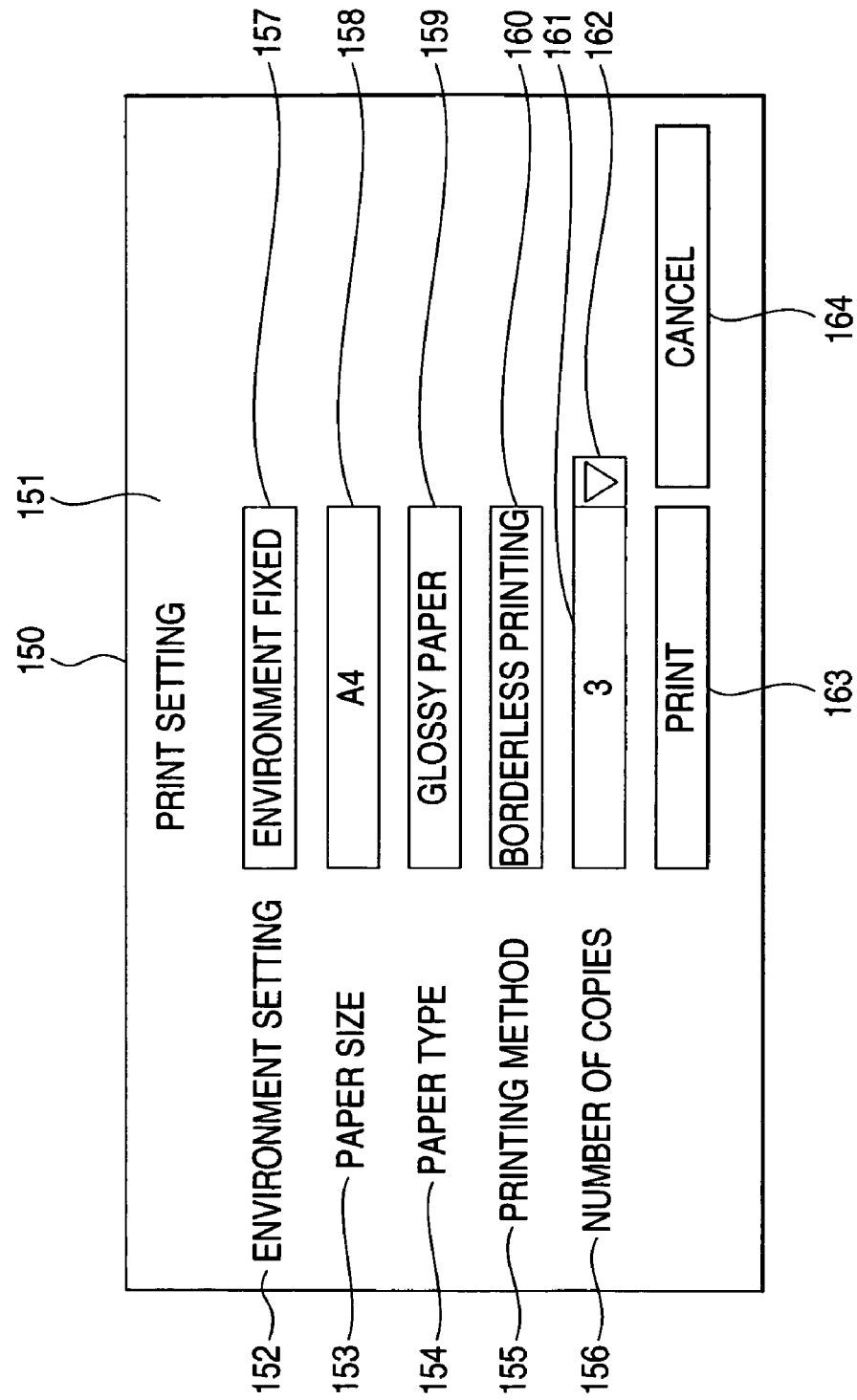
FIG. 8 is a view showing an example of a GUI displayed on a display section shown in FIG. 1.

FIG. 8 is a view showing an example of a GUI displayed on the display device 98 at this time. In the example, at a topmost section in a frame 150, "PRINT SETTING" is displayed as a title. Below the title, texts 152 through 156, a text box 157, and buttons 162 through 164 are displayed.

The texts 152 through 156 referred to here are descriptions of contents of respective setting items. The text box 157 displays whether or not the environment has been fixed. This example indicates that the environment is fixed. Accordingly, as will be described later, changing of the settings of print attributes displayed in text boxes 158 through 160 is prohibited. The text box 158 displays a size of the printing paper P which is currently set on the printer 22 side. In this example, "A4" is displayed; that is, the printing paper P of A4-size is set in the printer 22. The text box 159 displays a type of the printing paper P which is currently set on the printer 22 side. In this example, "GLOSSY PAPER" is displayed; that is, the printing paper P set in the printer 22 is glossy paper. The text box 160 displays a printing method which is currently set on the printer 22 side. In this example, "BORDERLESS PRINT" is displayed; that is, borderless printing is set on the printer 22 side. In addition, the number of copies to be printed is input in the text box 161. More specifically, by operating the button 162, a desired number of copies can be selected from numbers of copies displayed in the form of a list. In this example, "3" is selected as the number of copies to be printed. The button 163 is a button which is operated for performing printing in accordance with the thus-set setting. The button 164 is a button which is operated for canceling printing in accordance with the thus-set setting.

The GUI shown in FIG. 8 is an example display corresponding to a case where the printing attributes are fixed. Therefore, the text boxes 158 through 160 are prohibited from being changed, and only the number of copies to be printed can be set.

Step S33: The CPU 91 causes the display device 98 to display a GUI for print setting. More specifically, the CPU 91 acquires predetermined data stored in the HDD 94, and supplies the data to the video circuit 95. As a result, the video circuit 95 executes rendering processing, and the thus-obtained video signals are supplied to the display device 98.

Step S34: The CPU 91 displays the attribute data acquired in step S30 as an initial value (default value) inside the GUI displayed in step S33.

Figure 9:
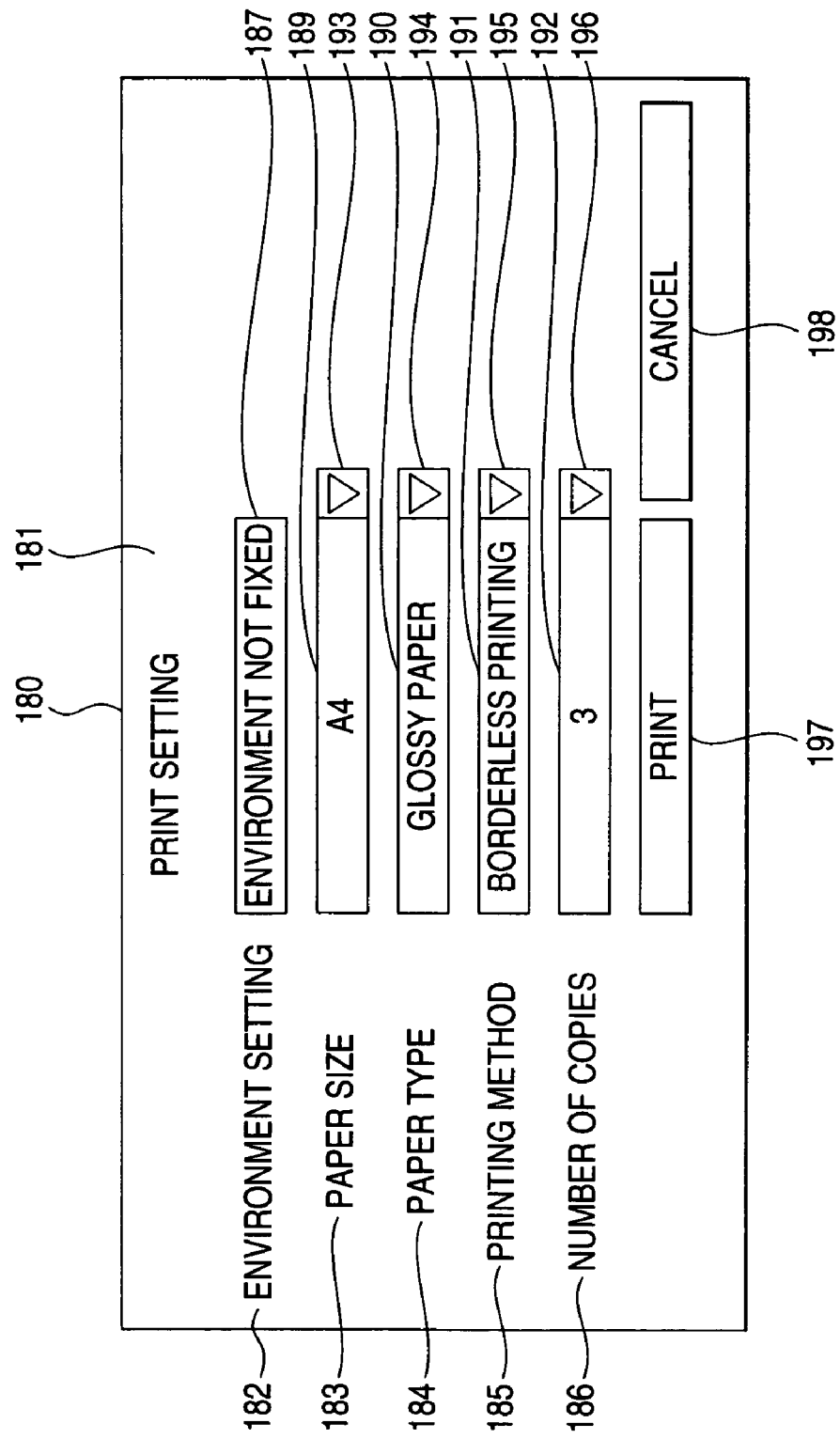
FIG. 9 is a view showing another example of a GUI displayed on a display section shown in FIG. 1.

FIG. 9 is a view showing an example of a GUI displayed on the display device 98 at this time. In this example, at a topmost section in a frame 180, "PRINT SETTING" is displayed as a title. Below the title, texts 182 through 186, text boxes 187 through 192, and buttons 193 through 198 are displayed.

The texts 182 through 186 referred to here are descriptions of contents of respective setting items. The text box 187 displays whether or not the environment has been fixed. This example indicates that the environment is not fixed. Accordingly, in contrast to the case shown in FIG. 8, setting of items displayed in the text boxes 189 through 192 can be changed. The text box 189 displays a size of the printing paper P which is currently set on the printer 22 side as an initial value. The initial value can be changed to another value by means of operating the button 193. In this example, "A4" is displayed; that is, the printing paper P of A4-size is set in the printer 22, and this value is displayed as the initial value. The text box 190 displays a type of the printing paper P which is currently set on the printer 22 side as an initial value. The initial value can be changed to another value by means of operating the button 194. In this example, "GLOSSY PAPER" is displayed; that is, the printing paper P set in the printer 22 is glossy paper, and displayed as the initial value. The text box 191 displays a printing method which is currently set on the printer 22 side as an initial value. The initial value can be changed to another value by means of operating the button 195. In this example, "BORDERLESS PRINT" is displayed; that is, the borderless printing is set in the printer 22, and displayed as the initial value. The number of copies to be printed is input in the text box 192. More specifically, by means of operating the button 196, a desired number of copies is selected from numbers of copies displayed in a form of a list. In this example, "3" is selected as the number of copies to be printed. The button 197 is a button which is operated for performing printing in accordance with the thus-set setting. The button 198 is a button which is operated for canceling printing in accordance with the thus-set setting.

The GUI shown in FIG. 9 is an example display corresponding to a case where the printing attributes are not fixed. Therefore, in contrast to the case illustrated in FIG. 8, the text boxes 189 through 191 display the initial values corresponding to the print attributes having been set in the printer 22 first (i.e., displayed as default values); and these values can be changed by means of operating the buttons 193 through 195.

Step S35: The CPU 91 determines, after setting has been made in the GUI shown in FIG. 8 or 9, whether or not the button 163 or 197 has been operated. If the button has been operated, the flow advances to step S36; and in other cases, processing similar to that performed previously is performed.

Step S36: The CPU 91 performs printing processing. More specifically, the CPU 91 supplies image data having been produced by the application program 123, and the like, to the printer driver 121 by way of the PIC 122. The printer driver 121 applies resolution conversion, halftone processing, and the like, to the image data, and the like, supplied from the application program 123 in accordance with the attribute data (in a case where a change is made in the GUI, the attribute data after change; and in other cases, the attribute data supplied from the status monitor 120). Thereafter, the printer driver 121 supplies the print signals PS to the printer 22. Consequently, the printer 22 performs printing processing.

As described above, in the printing system according to the present embodiment, when setting of print attributes is made on the printer 22 side, the environment is fixed. Accordingly, a setting different from the thus-set setting is made in the computer 90, thereby preventing performance of printing in accordance with a wrong setting. In addition, when the environment is not be fixed, the attributes can be arbitrarily changed. Therefore, printing can be performed in accordance with a setting different from that having been set on the printer 22 side, as required.

The computer 90 has a plurality of functions. Therefore, in particular, beginners, the elderly, or the like, often encounter difficulty in changing setting of the printer driver 121. In contrast, the printer 22 is limited in functions, and provided with relatively few operation keys. Accordingly, in many cases, setting of the attribute data in the printer 22 is easy and convenient. Therefore, according to the printing system according to the embodiment of the invention, operability for a user can be enhanced.

In addition, in a case where the computer 90 is shared by a plurality of users, for instance, when setting in the computer 90 is changed by a user having authority, the setting is preferably not changed to another setting. Therefore, in such a case, by means of setting the environment to be fixed, casual changing by another user can be prevented.

Figure 10:
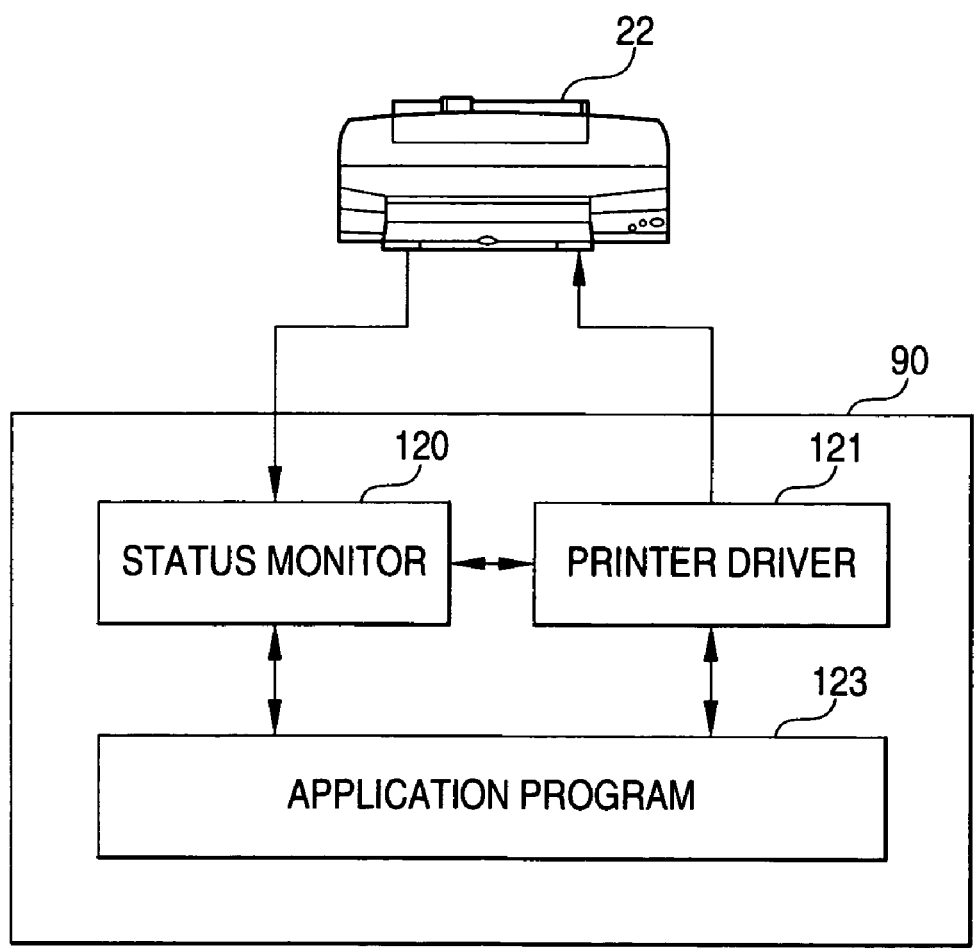
FIG. 10 is a view showing a program to be installed in the computer shown in FIG. 1.

Hithertofore, an embodiment of the invention has been described. However, the invention can be modified in various manners other than the above. For instance, the above embodiment has described a case where the PIC 122 is included. However, the present invention can be applied even to a case where the PIC is not included as illustrated in FIG. 10. In the case, exchange of data between the application program 123, and the status monitor 120 or the printer driver 121 is complicated as compared with the case illustrated in FIG. 1. However, the present invention can be applied in a similar manner as described above even when employing such a configuration.

The above embodiment has been described by reference to an example case where the printer 22 and the computer 90 are connected in one-to-one correspondence. However, the present invention can be applied even to, for instance, a case where a plurality of computers are connected to the printer 22. Furthermore, similarly, the invention can be applied to a case where a plurality of users are included. Meanwhile, in the case where a plurality of computers are connected, or where a plurality of users are included, the environment can be set to be either fixed or non-fixed in accordance with an authority having been imparted to the users or the computers. For instance, the environment may be set to be non-fixed for a user having authority, and to be fixed for other users.

The above embodiment has been described by reference to an example case where the print attributes which can be set to be either non-fixed or fixed include a size of paper, type of paper, and printing method. However, other print attributes may be included. In addition, there may also be employed a configuration where only desired print attributes are set to be fixed or non-fixed among a plurality of print attributes. According to such an embodiment, only attributes desired by a user can be set to be non-fixed or fixed.

The above embodiment has been described by reference to a configuration such that a size and type of paper are automatically detected by the optical sensor 39. However, a user may input these items manually.

Alternatively, the following configuration is also applicable. The attribute data are supplied to the application program 123, and data with regard to paper size, print position, and the like, are used in the GUI with regard to setting of paper. For instance, in a case where the printing paper P of A4-size is set in the printer 22, changing paper size may be prohibited in accordance with whether the environment is fixed or non-fixed at the time of setting paper by the application program 123.

The above embodiment employs the printer 22 including heads which eject ink with use of piezoelectric elements. However, in place of the piezoelectric elements, any of a variety of other devices may be utilized as an ejection-drive device. For instance, the invention can also be applied to a printer including an ejection-drive device of a type in which a heater disposed on an ink channel is energized and generates bubbles in the ink channel, thereby causing the bubbles to eject ink.

There may also be employed such a configuration that the GUI shown in FIG. 8 or 9 displays a preview screen when the button 163 or 197 is operated. According to such a configuration, printing result can be confirmed before actual printing.

Meanwhile, a program in which the above processing and functions are described can be recorded in a computer-readable recording medium. Examples of the computer-readable recording medium include a magnetic recorder, an optical disk, a magneto-optical recording medium, and a semiconductor memory. Examples of the magnetic recorder include a hard disk drive (HDD), a flexible disk (FD), and a magnetic tape. Examples of the optical disk include a DVD, a DVD RAM (random access memory), a CD-ROM, and a CD-R (recordable)/RW (rewritable). Examples of the magneto-optical recording medium include an MO.

For distribution of the program, for instance, a portable recording medium, such as a DVD or a CD-ROM, in which the program is recorded is sold. Alternatively, the following method is also applicable. The program is stored in a recording medium of a server computer, and transferred from the server computer to another computer by way of a network.

A computer for executing the program stores a program which is, for instance, recorded on a portable recording medium or transferred from the server computer, in its own storage device. Thereafter, the computer reads out the program from its own storage device, and executes processing in accordance with the program. Alternatively, the computer may read out the program directly from a portable recording medium, and perform processing in accordance with the program. Alternatively, the computer may sequentially perform processing ill accordance with the thus-received program every time a program is transferred from the server computer.

FIG. 1
40
CONTROL CIRCUIT
 FIG. 2
50
I/F-DEDICATED CIRCUIT
52
HEAD DRIVE CIRCUIT
54
MOTOR DRIVE CIRCUIT
 FIG. 3
95
VIDEO CIRCUIT
98
DISPLAY DEVICE
99
INPUT DEVICE
100
EXTERNAL STORAGE
22
PRINTER
 FIG. 4
120
STATUS MONITOR
121
PRINTER DRIVER
123
APPLICATION PROGRAM
 FIG. 5
START
S10
SCAN PAPER
S11
DETERMINE PAPER SIZE
S12
DETERMINE PAPER TYPE
S13
PERFORM LAYOUT SETTING
S14
PERFORM PRINT EFFECT SETTING
S15
HAS SETTING BEEN COMPLETED?
S16
STORE ATTRIBUTE DATA
S17
HAS ENVIRONMENT BEEN FIXED?
S18
PROCESSING FOR FIXING ENVIRONMENT
END
 FIG. 6
141
ENVIRONMENT SETTING DATA

142
PAPER SIZE DATA
143
PAPER TYPE DATA
144
PRINTING METHOD DATA
  FIG. 7
START
S30
ACQUIRE ATTRIBUTE DATA
S31
HAS ENVIRONMENT BEEN FIXED?
S32
DISPLAY GUI FOR PRINT SETTING
833
DISPLAY GUI FOR PRINT SETTING
S34
DISPLAY INITIAL VALUE
S35
HAS SETTING BEEN COMPLETED?
S36
PRINT PROCESSING
END
  FIG. 8
151
PRINT SETTING
152
ENVIRONMENT SETTING
153
PAPER SIZE
154
PAPER TYPE
155
PRINTING METHOD
156
NUMBER OF COPIES
157
ENVIRONMENT FIXED
159
GLOSSY PAPER
160
BORDERLESS PRINTING
163
PRINT
164
CANCEL
  FIG. 9
181
PRINT SETTING
182
ENVIRONMENT SEWING
183
PAPER SIZE
184
PAPER TYPE
185
PRINTING METHOD
186
NUMBER OF COPIES
187
ENVIRONMENT NOT FIXED
190
GLOSSY PAPER
191
BORDERLESS PRINTING
197
PRINT
198
CANCEL
  FIG. 10
120
STATUS MONITOR
121
PRINTER DRIVER
123
APPLICATION PROGRAM

What is claimed is:
1. A printing system including a printing apparatus and an information processor, wherein
  the printing apparatus includes:
    first input means for receiving input of attribute data in correspondence with print attributes pertaining to printing, the attribute data corresponding to information indicating at least one of a size and type of printing paper, a print position and a printing method, the printing apparatus performing the printing based on the attribute data,
    second input means for receiving an input of fixation data which indicate whether or not to fix at least a portion of the print attributes,
    storage means for storing the attribute data and the fixation data having been input by means of the first and second input means, and
    transmission means for transmitting the attribute data and the fixation data stored in the storage means to the information processor upon request from the information processor; and
  the information processor includes:
    request means for making a request to the transmission means of the printing apparatus for transmission of the attribute data and the fixation data,
    receiving means for receiving the attribute data and the fixation data having been transmitted upon request from the request means,
    display means for displaying the fixation data and the attribute data, the display means for, when the fixation data indicate fixing of at least a portion of the print attributes, displaying a button next to attribute data corresponding to non-fixed print attributes based on the input of the fixation data received by the second input means of the printing apparatus, the button indicating that the attribute data next to the button can be changed, the button having a triangle shape, the attribute data next to the button which can be changed by operating the button, and prohibition means for, when the fixation data indicate fixing of at least a portion of the print attributes, prohibiting changing of attribute data corresponding to fixed print attributes and for causing selection of attribute data corresponding to non-fixed print attributes from a plurality of candidates for selection by operating the button.

2. The printing system according to claim 1, wherein the first input means automatically acquires data, among the print attributes, with regard to a size or a type of printing paper by means of an optical sensor.

3. The printing system according to claim 1, wherein the prohibition means determines, in accordance with an authority of the information processor or an authority of a user who utilizes the information processor, whether or not to prohibit changing of the attribute data of the print attributes.

4. The printing system according to claim 1, wherein the prohibition means causes attribute data having been transmitted from the printing apparatus to be displayed as an initial value corresponding to the attribute data and non-fixed print attributes.

* * * * *